United States Patent [19]

Hanson

[11] 3,863,136

[45] Jan. 28, 1975

[54] FREQUENCY CONVERTING APPARATUS

[75] Inventor: Russell W. Hanson, Cedar Rapids, Iowa

[73] Assignee: Rockwell International Corporation, Dallas, Tex.

[22] Filed: Oct. 26, 1973

[21] Appl. No.: 410,141

[52] U.S. Cl. .................... 321/60, 307/220, 307/251, 307/304, 321/69 NL, 325/451

[51] Int. Cl. ........................................... H02m 5/30

[58] Field of Search... 321/60, 69 R, 61, 65, 69 NL; 307/251, 304, 220; 325/451; 332/21, 52, 52 T; 328/15, 16

[56] References Cited

UNITED STATES PATENTS

| | | | |
|---|---|---|---|
| 2,992,328 | 7/1961 | Chow | 325/451 |
| 3,093,752 | 6/1963 | Christensen | 321/60 X |
| 3,386,053 | 5/1968 | Priddy | 325/451 X |
| 3,436,681 | 4/1969 | Hart | 307/304 X |
| 3,510,781 | 5/1970 | Wollesen | 325/451 |
| 3,581,211 | 5/1971 | Maitland et al. | 325/451 |
| 3,617,898 | 11/1971 | Janning, Jr. | 321/60 X |
| 3,626,302 | 12/1971 | Nakamura et al. | 321/60 X |
| 3,716,730 | 2/1973 | Cerny, Jr. | 325/451 X |

*Primary Examiner*—Gerald Goldberg
*Attorney, Agent, or Firm*—Bruce C. Lutz

[57] ABSTRACT

A single active element circuit for combining an input signal with a feedback signal to produce an output which is indicative in frequency of the sum and/or the difference of the frequency of the signals being mixed. The resulting circuit can be used in one embodiment for a divide by two or multiply by one and one-half converter and in a second embodiment can be used for combining a signal with a local oscillator frequency for either up or down frequency conversion.

6 Claims, 2 Drawing Figures

FREQUENCY CONVERTING APPARATUS

THE INVENTION

The present invention is generally associated with electronic circuits and more specifically with circuits for converting an input signal of a given frequency to an output signal of a different frequency.

While the prior art has covered the concept of mixing feedback signals with incoming signals to produce the sum or difference frequency at the output of a mixing device which output is first filtered before being fed back, these prior art devices have normally included more than one active element. One prior art device which is similar to the present invention is a pentagrid converter. This circuit utilizes a five-grid tube but even it is more complex than a similar embodiment of the present invention as disclosed.

It is therefore, an object of the present invention to provide improved frequency converting circuits using a minimum number of components.

Other objects and advantages of the present invention will be apparent from a reading of the specification and appended claims in conjunction with the drawings wherein:

FIG. 1 is a detailed circuit diagram of an embodiment of the invention utilized for converting an RF input signal to an IF output signal; and FIG. 2 is a detailed circuit diagram for dividing or multiplying an input signal by a specific conversion factor to produce a new frequency output signal.

DETAILED DESCRIPTION

Figure 1:
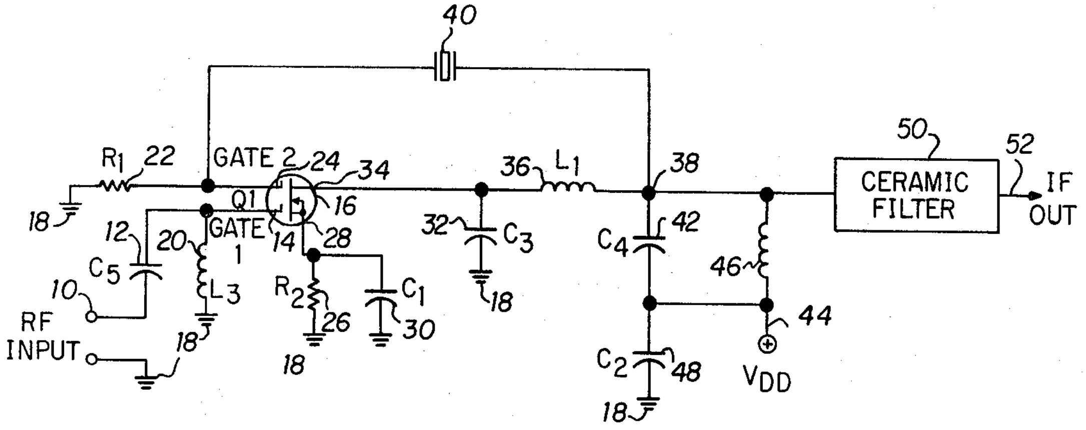

In FIG. 1 an input terminal 10 provides input signals through a capacitor 12 to a first gate or gating means 14 of a dual gate field effect transistor or FET 16. The input signals are applied between terminal 10 and ground 18. An inductance 20 is connected between gate 14 and ground 18. The capacitor 12 in combination with inductor 20 provide an impedance matching network between the RF source and the gate 14 of the FET 16. A bias impedance or resistor 22 is connected between ground 18 and a second gate or gating means 24 of FET 16. A second bias resistor 26 is connected between ground 18 and a source terminal 28 of FET 16. A capacitor 30 is connected in parallel with resistor 26. Capacitor 30 provides the function of signal frequency bypass of the bias resistor 26. A capacitor 32 is connected between a drain terminal 34 of FET 16 and ground 18. An inductor 36 is connected between drain 34 and a junction point 38. A crystal 40 is connected between junction point 38 and gate 24. A capacitor 42 is connected between junction 38 and a positive power terminal 44. Capacitors 32 and 42 in combination with inductor 36 provide a tuned circuit which in combination with crystal 40 provide a feedback network for enabling the transistor 16 to oscillate at the crystal frequency while being modulated at the RF input frequency. An inductor 46 is connected in parallel with capacitor 42. Inductor 46 has a high impedance to the intermediate frequency output and thus the output is not drained or shorted through the power supply to ground. A capacitor 48 is connected between the power supply 44 and ground 18 for filtering purposes. A ceramic filter 50 is connected between junction point 38 and an output 52.

The filter 50 may in a preferred embodiment be a crystal or ceramic filter since this type of load presents a higher impedance as the frequency applied moves out of the band of frequencies normally passed by the filter.

Figure 2:
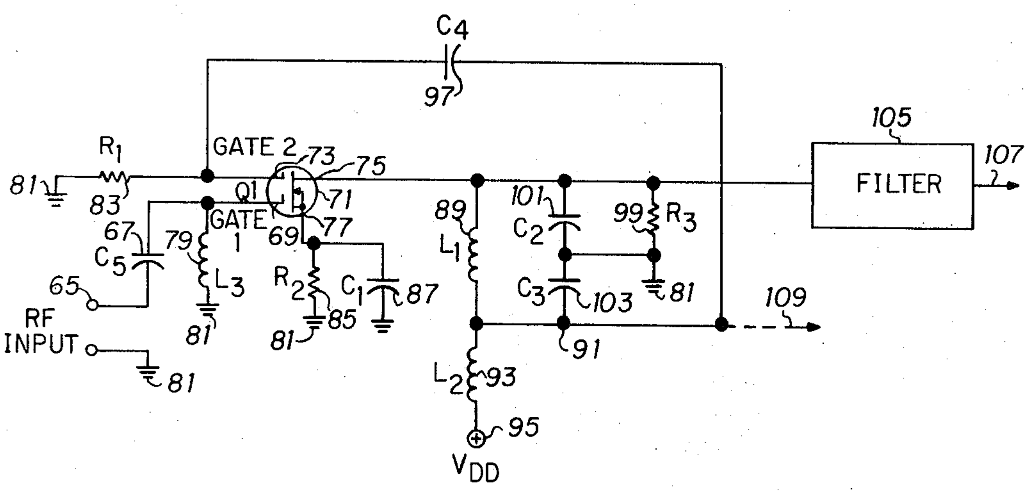

An input terminal 65 in FIG. 2 is connected through a capacitor 67 to a first gate 69 of a dual gate FET generally designated as 71 having a second gate 73, a drain 75, and a source 77. An inductor 79 is connected between gate 69 and ground 81. A first bias resistor 83 is connected between gate 73 and ground 81 while a second bias resistor 85 is connected between source 77 and ground 81. A capacitor 87 is connected in parallel with resistor 85. The components 67, 79, 83, 85 and 87 perform substantially the identical function as similar components in FIG. 1. An inductor 89 is connected between drain 75 and a junction point 91 while a further inductor 93 is connected between junction point 91 and a positive power terminal 95. A capacitor 97 is connected between junction point 91 and gate 73. A load resistor 99 is connected between drain 75 and ground 81. A capacitor 101 is connected in parallel with resistor 99 while a capacitor 103 is connected between ground 81 and junction point 91. A filter 105 is connected between drain 75 and an output designated as 107. A dashed line is shown between junction point 91 and an output terminal 109. The dashed line output illustrates an alternative output as will be discussed later.

The inductor 89 in combination with the capacitors 101 and 103 form a tuned circuit which is tuned to half the frequency applied at terminal 65. The capacitor 97 acts as a direct current blocking capacitor but allows passage of this signal which is half the circuit incoming signal frequency. The resistor 99 forms a load impedance for the FET 71 while the inductor 93 is a choke inductance for preventing shunting to ground of the feedback frequency signal supplied to gate 73.

OPERATION

Reference will be made first to FIG. 2 since this is the easiest to describe. It may be assumed for the purpose of initial description that the signal applied to gate 73 is one-half the frequency of the signal applied to gate 69. The FET 71 will combine the two incoming signals and provide as an output signal on lead 75 the sum and difference of the input frequencies. Since the signal on gate 73 is one-half the incoming signal on gate 69, the output will be one-half the input frequency as the difference and will be 1½ times the input frequency for the summation. The tuned filter comprising inductor 89 and capacitors 101 and 103 will permit passage of only the one-half frequency or subtraction component and this frequency will be fed back through capacitor C4 to form a closed loop operation. If only the one-half frequency component is desired, this can be obtained on lead 109. However, the load must be of high impedance so that it does not interfere with the operation of the circuit. The normal usage of the circuit of FIG. 2 would utilize a filter such as 105 which would be tuned to either half the frequency of the incoming signal as applied to terminal 65 or to one and one-half times this frequency so as to eliminate the other frequency component resulting from the mixing action.

In FIG. 1 the same mixing action occurs in FET 16. However, FIG. 1 contains its own crystal-controlled oscillator for generating a desired constant frequency which bears substantially no relation to the incoming signal as applied to terminal 10. This oscillator is fed by perturbations in the circuit and amplified by the power gain between gate 24 and output 34 of the FET 16. Thus, the components 32, 36, 40, and 42 provide a signal which in one embodiment was 4.388 MHz as limited by crystal 40 while the RF input was 4.843 MHz. The mixing action produced both the sum and the difference frequency. The filter comprising the components 32, 36 and 42 are of broad enough band to pass both the sum and the difference frequencies and thus allow the feedback signal necessary to sustain the oscillation. The inductor 46 may be of such a value that it presents a high impedance to the oscillator frequency as well as the difference frequency. Since there is a large difference between the sum and the difference frequencies and this difference is in the neighborhood of 4 MHz, the ceramic filter 50 can easily be designed to pass only the 455 KHz difference frequency components. As previously indicated a crystal or ceramic filter rises in impedance for frequencies outside the designed band pass and thus presents a high impedance to the oscillation frequency of the oscillator section of this circuit. Therefore, there is negligible loading of the oscillator circuit by the apparatus connected to terminal 52.

As will be realized, the circuit of FIG. 1 can be used in the same manner to convert from an IF input to an RF output by merely changing circuit component values.

While two preferred embodiments of the present invention have been illustrated as well as an alternative to one of these embodiments, I wish to be limited not by the embodiments shown but rather by the scope of the appended claims.

I claim:

1. Frequency converter apparatus comprising, in combination:

single active element means including first and second input means and output means;

means for supplying an alternating signal of frequency $f_1$ to said first input means of said active element means;

filter means, connected between said output means and said second input means of said active element means, for passing only alternating signals of frequency $f_2$ to said second input means; and apparatus output means connected to said filter means for providing converter frequency output signals.

2. Converter apparatus as claimed in claim 1 wherein:

said apparatus output means includes filter means for passing only signals of frequency $3f/2$.

3. Apparatus as claimed in claim 1 wherein:

said active element is a dual gate field effect transistor; and said apparatus output means is connected to the output of said filter means.

4. Apparatus as claimed in claim 1 wherein the signal frequency $f_2$ passed by said filter means is equal to one-half the signal frequency $f_1$.

5. Frequency converting apparatus comprising, in combination:

field effect transistor means including drain means, source means, first gate means and second gate means;

apparatus input means for providing an input signal to be frequency converted;

ground potential means;

impedance matching means comprising a series connected first capacitance means and first inductive means and further including an intermediate junction therebetween;

means connecting said impedance matching means between said apparatus input means and said ground means;

means connecting said intermediate junction of said impedance matching means to said first gate means of said field effect transistor means;

first bias impedance means connected between said ground means and said second gate means;

second bias impedance means, connected between said source means and said ground means;

signal frequency bypass means connected in parallel with said second bias impedance means;

positive power supply means;

second inductive means connected between said drain means and said power supply means;

second capacitance means connected between said drain means and said ground means;

third capacitance means connected between said positive power supply means and said ground means; and fourth capacitance means connected between said positive power supply means and said second gate means.

6. Frequency converter apparatus comprising, in combination:

field effect transistor means including drain means, source means, first gate means and second gate means;

ground potential means;

positive power supply means;

signal supplying input means for supplying an input signal to be frequency converted;

impedance matching means comprising first capacitive means and first inductive means connected in series and incorporating a first intermediate junction therebetween;

means connecting said impedance matching means between said signal supplying input means and said ground means;

means connecting said first intermediate junction to said first gate means of said field effect transistor means;

first bias means connected between said ground means and said second gate means;

second bias means connected between source means and said ground means;

signal frequency bypass means connected in parallel with said second bias means;

second capacitance means connected between said drain means and said ground means;

second and third inductive means connected in series between said drain means and said positive power supply means and including a second intermediate junction therebetween;

crystal oscillating means connected between said second gate means and said second intermediate junction;

third capacitive means connected between said second intermediate junction means and said positive power supply means; and filter means connected to said second intermediate junction for providing a converted frequency output signal.

* * * * *